United States Patent
Horiba (10) Patent No.: US 12,100,223 B2
(45) Date of Patent: Sep. 24, 2024

(54) IMAGE PROCESSING DEVICE, IMAGE PROCESSING METHOD, AND A NON-TRANSITORY STORAGE MEDIUM

(71) Applicant: TOYOTA JIDOSHA KABUSHIKI KAISHA, Toyota (JP)

(72) Inventor: Kazuki Horiba, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 360 days.

(21) Appl. No.: 17/654,705

(22) Filed: Mar. 14, 2022

(65) Prior Publication Data
US 2022/0301319 A1  Sep. 22, 2022

(30) Foreign Application Priority Data
Mar. 16, 2021  (JP) ................................ 2021-042202

(51) Int. Cl.
 *G06V 20/56* (2022.01)
 *G06T 7/20* (2017.01)
 *G06V 10/10* (2022.01)

(52) U.S. Cl.
 CPC ............... *G06V 20/56* (2022.01); *G06T 7/20* (2013.01); *G06V 10/10* (2022.01); *G06T 2207/30252* (2013.01)

(58) Field of Classification Search
 CPC ........ G06V 20/56; G06V 10/10; G06V 20/58; G06T 7/20; G06T 2207/30252
 See application file for complete search history.

(56) References Cited

U.S. PATENT DOCUMENTS

| | | | | |
|---|---|---|---|---|
| 10,235,768 | B2 * | 3/2019 | Sasaki | G06T 7/70 |
| 11,470,268 | B2 * | 10/2022 | Takatsuka | G06F 18/24 |
| 2004/0109060 | A1 | 6/2004 | Ishii | |
| 2007/0140527 | A1 * | 6/2007 | Yamamoto | G06V 20/58 |
| | | | | 382/104 |
| 2015/0269449 | A1 * | 9/2015 | Kosaki | G06F 18/28 |
| | | | | 382/103 |
| 2015/0334269 | A1 * | 11/2015 | Yokota | H04N 23/682 |
| | | | | 382/103 |
| 2020/0361377 | A1 | 11/2020 | Shiga et al. | |

(Continued)

FOREIGN PATENT DOCUMENTS

| | | | |
|---|---|---|---|
| JP | 2007172035 A | 7/2007 | |
| JP | 2009-205386 A | 9/2009 | |

(Continued)

*Primary Examiner* — Md K Talukder
(74) *Attorney, Agent, or Firm* — SoraIP, Inc.

(57) ABSTRACT

An image processing device includes one or more processors configured to: recognize a category of an object within a range of a predetermined distance with respect to a vehicle based on a detection result of a sensor, the sensor including an image sensor; decide the number of images subjected to image processing per unit time based on the category of the object recognized by the one or more processors; acquire, from the image sensor, a plurality of images obtained by continuously shooting the object as a subject; select one or more target images from among the images acquired by the one or more processors based on the number of images subjected to the image processing per unit time decided by the one or more processors; and calculate information regarding the object based on the one or more target images.

10 Claims, 5 Drawing Sheets

(56) References Cited

U.S. PATENT DOCUMENTS

| | | |
|---|---|---|
| 2021/0152732 A1 | 5/2021 | Eki |
| 2021/0192692 A1 | 6/2021 | Takatsuka et al. |
| 2022/0217651 A1* | 7/2022 | Papasakellariou .... H04W 52/50 |
| 2022/0301319 A1* | 9/2022 | Horiba ................... G06V 20/56 |
| 2022/0309694 A1* | 9/2022 | Nobayashi ............... H04N 7/18 |

FOREIGN PATENT DOCUMENTS

| | | |
|---|---|---|
| JP | 2010068069 A | 3/2010 |
| JP | 2020013586 A | 1/2020 |
| JP | 2020068008 A | 4/2020 |
| JP | 2021013175 A | 2/2021 |

\* cited by examiner

IMAGE PROCESSING DEVICE, IMAGE PROCESSING METHOD, AND A NON-TRANSITORY STORAGE MEDIUM

CROSS-REFERENCE TO RELATED APPLICATION

This application claims priority to Japanese Patent Application No. 2021-042202 filed on Mar. 16, 2021, incorporated herein by reference in its entirety.

BACKGROUND

1. Technical Field

The present disclosure relates to an image processing device, an image processing method, and a non-transitory storage medium.

2. Description of Related Art

Japanese Unexamined Patent Application Publication No. 2009-205386 (JP 2009-205386 A) discloses a device for setting a frame rate of a camera according to a traveling state of a vehicle. This device increases the frame rate of an image sensor only when detection signals from a sensor suggest that the vehicle may be at risk, and under normal conditions maintains a standard frame rate of the image sensor, thereby suppressing the amount of processing and storage for taken images.

SUMMARY

However, there are cases in which the device described in JP 2009-205386 A cannot perform appropriate image processing on a subject. For example, when the subject is a pedestrian, image processing with high calculation costs is required. When the detection signals from the sensor suggest that the vehicle may be at risk, the frame rate will increase and the number of frames input per unit time will increase. Accordingly, the image processing time allowed per frame is shortened, and hence image processing regarding pedestrians, which requires high calculation costs, may not be able to be performed. Also, when the subject is a moving object that moves faster than a pedestrian, such as a vehicle, the number of frames to be processed may be small. Therefore, the position of the subject greatly changes from one frame to the next in accordance with the moving speed of the subject, which may affect difference detection. The present disclosure provides technology capable of appropriate image processing in accordance with subjects.

An image processing device according to a first aspect of the present disclosure includes one or more processors configured to: recognize a category of an object within a range of a predetermined distance with respect to a vehicle based on a detection result of a sensor, the sensor including an image sensor; decide the number of images subjected to image processing per unit time based on the category of the object recognized by the one or more processors; acquire, from the image sensor, a plurality of images obtained by continuously shooting the object as a subject; select one or more target images from among the images acquired by the one or more processors based on the number of images subjected to the image processing per unit time decided by the one or more processors; and calculate information regarding the object based on the one or more target images.

An image processing method according to a second aspect of the present disclosure is executed by one or more processors. The image processing method includes: recognizing a category of an object within a range of a predetermined distance with respect to a vehicle based on a detection result of a sensor, the sensor including an image sensor; deciding the number of images subjected to image processing per unit time based on the category of the object; acquiring, from the image sensor, a plurality of images obtained by continuously shooting the object as a subject; selecting one or more target images from among the images based on the number of images subjected to the image processing per unit time; and calculating information regarding the object based on the one or more target images.

A non-transitory storage medium according to a third aspect of the present disclosure stores instructions that are executable by one or more processors and that cause the one or more processors to perform functions including: recognizing a category of an object within a range of a predetermined distance with respect to a vehicle based on a detection result of a sensor, the sensor including an image sensor; deciding the number of images subjected to image processing per unit time based on the category of the object; acquiring, from the image sensor, a plurality of images obtained by continuously shooting the object as a subject; selecting one or more target images from among the images based on the number of images subjected to the image processing per unit time; and calculating information regarding the object based on the one or more target images.

According to the present disclosure, image processing can be appropriately performed in accordance with subjects.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An exemplary embodiment will be described below with reference to the drawings. Note that in the following description, elements that are the same or equivalent are denoted by the same signs, and duplicative description will not be repeated.

Configuration of Vehicle and Image Processing Device

Figure 1:
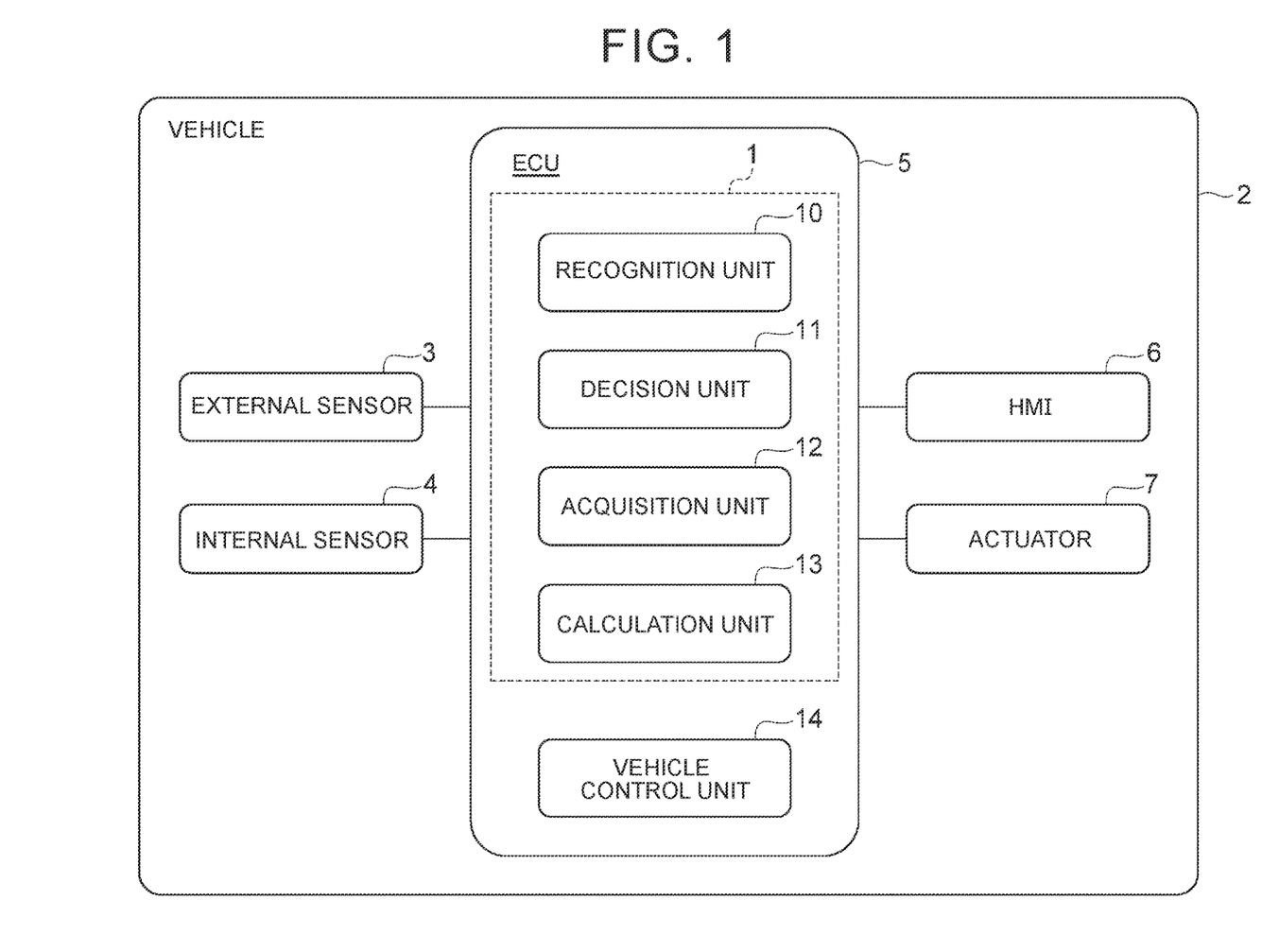
FIG. 1 is a functional block diagram of an example of a vehicle including an image processing device according to an embodiment.

FIG. 1 is a functional block diagram of an example of a vehicle including an image processing device according to the embodiment. As illustrated in FIG. 1, the image processing device 1 is installed in a vehicle 2, such as a bus, a taxi, or a general passenger car. As an example, the vehicle 2 includes an external sensor 3, an internal sensor 4, an electronic control unit (ECU) 5, a human-machine interface (HMI) 6, and an actuator 7.

The external sensor 3 is a detector that detects information regarding the external environment of the vehicle 2. The external environment is the positions of objects in the surroundings of the vehicle 2, the states of the objects, and so forth. The detection results from the external sensor 3 include the positions, shapes, colors, and so forth of objects ahead on the roadway on which the vehicle 2 travels. The objects include vehicles, pedestrians, traffic lights, road surface markings, and so forth. An example of the external sensor 3 is a camera.

The camera is an imaging apparatus that takes images of the external conditions of the vehicle 2. The camera is provided behind the windshield of the vehicle 2, as an example. The camera acquires image information regarding the external conditions of the vehicle 2. The camera may be a monocular camera or a stereo camera. A stereo camera has two imaging units arranged to reproduce binocular parallax. The image information obtained by the stereo camera also includes information in the depth direction. The camera takes images at a predetermined frame rate, and outputs the images obtained by continuously shooting a predetermined object as a subject. The predetermined frame rate is the number of images generated (output) per unit time. For example, a frame rate of 3 fps indicates that the number of frames generated (output) per second is three. The camera may output a moving image as continuously shot images.

The external sensor 3 is not limited to cameras, and may include a radar sensor or the like. A radar sensor is a detector that detects objects in the surroundings of the vehicle 2 by using radio waves (e.g., millimeter waves) or light. Examples of radar sensors include millimeter-wave radar and laser imaging detection and ranging (LIDAR). The radar sensor transmits radio waves or light to the surroundings of the vehicle 2, and detects objects by receiving the radio waves or light reflected by the objects.

The internal sensor 4 is a detector that detects the traveling state of the vehicle 2. The internal sensor 4 may include a vehicle speed sensor, an acceleration sensor, and a yaw rate sensor.

The ECU 5 controls the traveling of the vehicle 2. The ECU 5 is an electronic control unit that has a central processing unit (CPU), read-only memory (ROM), random-access memory (RAM), a controller area network (CAN) communication circuit, and so forth. The ECU 5 is connected to a network that communicates using the CAN communication circuit, for example, and is connected to the above-described components of the vehicle 2 so as to be able to communicate with each other. For example, the ECU 5 operates the CAN communication circuit to input/output data based on a signal output by the CPU, stores the data in the RAM, loads programs stored in the ROM to the RAM, and executes the programs loaded to the RAM, thereby realizing later-described functions. The ECU 5 may be composed of a plurality of electronic control units.

The HMI 6 is an interface between occupants (including the driver) of the vehicle 2 and the system realized by the ECU 5. As an example, the HMI 6 includes a touch display or the like, that is capable of displaying information and accepting input of operations performed by the occupants. The actuator 7 is a device that executes traveling control of the vehicle 2. The actuator 7 includes at least an engine actuator, a brake actuator, and a steering actuator.

Functions of ECU

The image processing device 1 includes a recognition unit 10, a decision unit 11, an acquisition unit 12, and a calculation unit 13, as functional configurations.

Figure 2A:
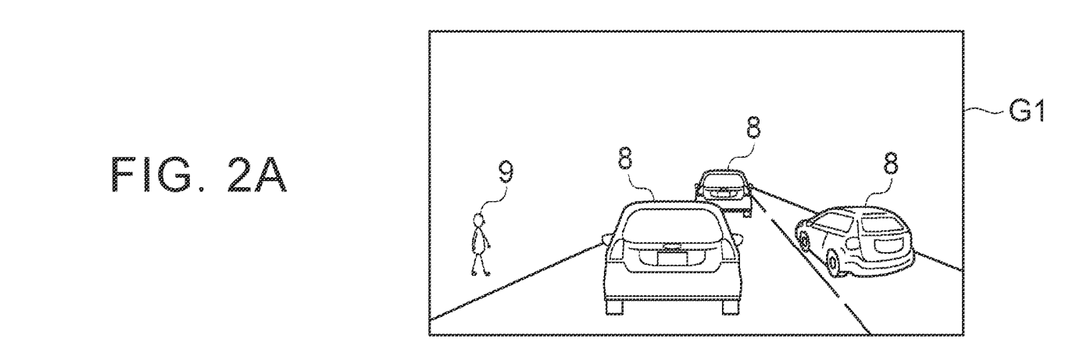
FIG. 2A illustrates detection results from an image sensor.

The recognition unit 10 recognizes the categories of objects in the surroundings of the vehicle, based on the detection results from the external sensor 3. The external sensor 3 used in the recognition unit 10 may be an image sensor or a radar sensor. The recognition unit 10 recognizes the categories of objects in the surroundings of the vehicle based on the detection results from the image sensor, and accordingly the sensor can be shared in processing to be performed at a later stage. The term "surroundings of the vehicle" means within a range of a predetermined distance with respect to the vehicle. The categories of objects are categories classified in advance as objects of recognition, and are optionally classified into stationary objects, vehicles, pedestrians, and so forth. FIG. 2A illustrates detection results from the image sensor. FIG. 2A is an image of an area ahead of the vehicle 2, which is taken by the image sensor and which includes vehicle 8 and a pedestrian 9. The recognition unit 10 performs object recognition based on pattern matching technology or the like, and recognizes categories of the vehicle 8 and the pedestrian 9. For example, the vehicle 8 are recognized as a category "vehicle", and the pedestrian 9 is recognized as a category "pedestrian".

The decision unit 11 decides the number of images subjected to image processing per unit time based on the category of the object recognized by the recognition unit 10. The number of images subjected to image processing per unit time is the processing rate of the calculation unit 13 that operates at a later stage. For example, when the processing rate is 3 fps, the calculation unit 13 performs image processing on three frames per second. The decision unit 11 decides the processing rate based on a predetermined relation between the category of the object and the processing rate. The predetermined relation between the category of the object and the processing rate may be defined in the form of a table, for example. As an example, the category "vehicle" is associated with a processing rate RA (e.g., 36 fps), and the category "pedestrian" is associated with a processing rate RB (e.g., 4 fps).

The reason why the processing rate of the category "vehicle" is higher than that of the category "pedestrian" is that the position of the vehicle may not be accurately recognized unless the processing rate is faster. Vehicles tend to move faster than pedestrians, and the positional change thereof per unit time is greater than that of pedestrians. On the other hand, the reason why the processing rate of the category "pedestrian" is lower than that of the category "vehicle" is that there is no need to increase the processing rate. Pedestrians tend to move slower than vehicles, the positional change thereof per unit time is smaller than that of the vehicle. Furthermore, pedestrians are objects of highest priority among traffic participants, and accordingly the image processing device needs to reinforce recognition. Raising the processing rate will reduce the processing time that can be spent for each image, and as a result, the recognition accuracy may deteriorate. In this way, the processing rate of the category "vehicle" is set higher than that of the category "pedestrian". Note that the categories are not limited to vehicles and pedestrians, and may be classified into stationary objects and moving objects, or the like, as appropriate.

Figure 2B:
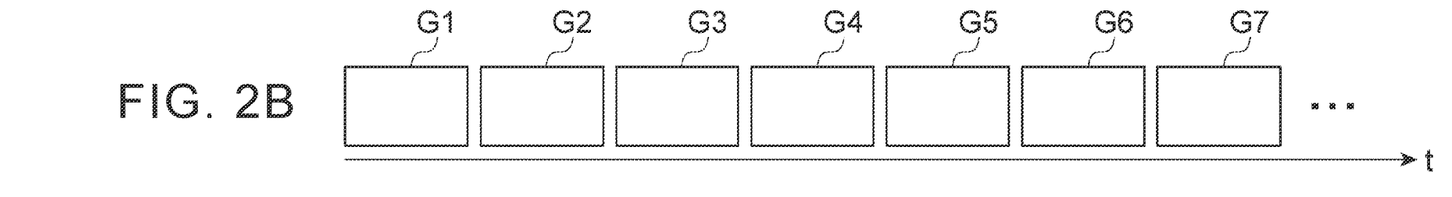
FIG. 2B is a schematic diagram of a frame rate in the image sensor.

The acquisition unit 12 acquires, from the external sensor 3, a plurality of images obtained by continuously shooting an object as a subject. The external sensor 3 that is the acquisition source for the acquisition unit 12 is an image sensor. The acquisition unit 12 acquires the images obtained by continuously shooting an object (vehicle, pedestrian, etc.) recognized by the recognition unit 10 as a subject. The images acquired by the acquisition unit 12 are images output at the frame rate of the image sensor. FIG. 2B is a schematic diagram of a frame rate of the image sensor. In FIG. 2B, images Gn (in which n is an integer) are shown in a time series with regard to imaging timing. As shown in FIG. 2B, the acquisition unit 12 acquires images Gn taken at predetermined intervals. The intervals may be constant, but do not have to be constant. The acquisition unit 12 may acquire one image at a time from the image sensor. Also, a plurality of images may be recorded in a buffer or the like from the image sensor, and the acquisition unit 12 may acquire the images from the buffer or the like over several times or at one time.

Figure 2C:
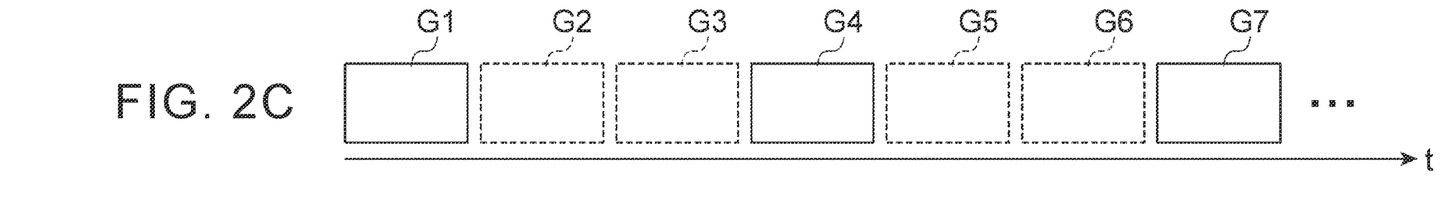
FIG. 2C is a schematic diagram of a high processing rate in the image processing device.
Figure 2D:
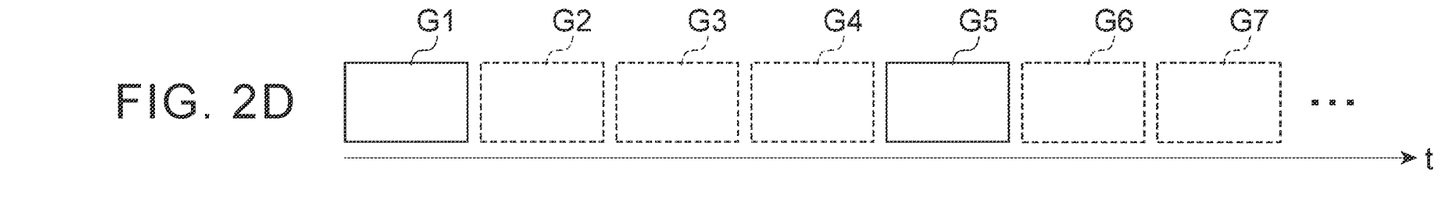
FIG. 2D is a schematic diagram of a low processing rate in the image processing device.

The calculation unit 13 selects one or more target images from among the images acquired by the acquisition unit 12 based on the processing rate decided by the decision unit 11. The calculation unit 13 thins out the images acquired by the acquisition unit 12 and selects the remaining images as the target images in accordance with the processing rate decided by the decision unit 11. For example, the processing rate RA of the category "vehicle" is faster than the processing rate RB of the category "pedestrian". That is to say, the processing rate RA of the category "vehicle" is the high processing rate, and the processing rate RB of the category "pedestrian" is the low processing rate. FIG. 2C is a schematic diagram of the high processing rate in the image processing device, and FIG. 2D is a schematic diagram of the low processing rate in the image processing device. At the high processing rate shown in FIG. 2C, the calculation unit 13 thins out images G2, G3, G5, and G6, and selects images G1, G4, and G7 as the target images. At the low processing rate shown in FIG. 2D, the calculation unit 13 thins out images G2, G3, G4, G6, and G7, and selects images G1 and G5 as the target images. As shown in FIGS. 2C and 2D, at high processing rates, the number of images to be processed per second is greater than at low processing rates. Thus, the image processing device 1 changes the processing rate without changing the frame rate of the image sensor.

The calculation unit 13 calculates information regarding the object based on the target images. The information regarding the object is information regarding the object that can be acquired from the images obtained by continuously shooting the object as the subject, examples of which include a speed or acceleration of the object, classification results finer than the category, and so forth. The classification results finer than the category are categories into which the above categories are further classified, examples for vehicles including a bus, a truck, a taxi, etc. and examples for pedestrians including an adult, a child, gender, hairstyle, etc. As shown in FIG. 2C, when the object (subject) is a vehicle and the target images are selected at the high processing rate, the calculation unit 13 acquires information regarding the vehicle 8 based on the images G1, G4, and G7. Also, as shown in FIG. 2D, when the object (subject) is a pedestrian and the target images are selected at the low processing rate, the calculation unit 13 acquires information regarding the pedestrian 9 based on the images G1 and G5.

The ECU 5 may further include a vehicle control unit 14. The vehicle control unit 14 controls the vehicle 2 by operating the actuator 7 based on the information regarding the object obtained by the image processing device 1, for example. Alternatively, the vehicle control unit 14 causes the HMI 6 to display information based on the information regarding the object obtained by the image processing device 1, for example.

Operations of Image Processing Device

Figure 3:
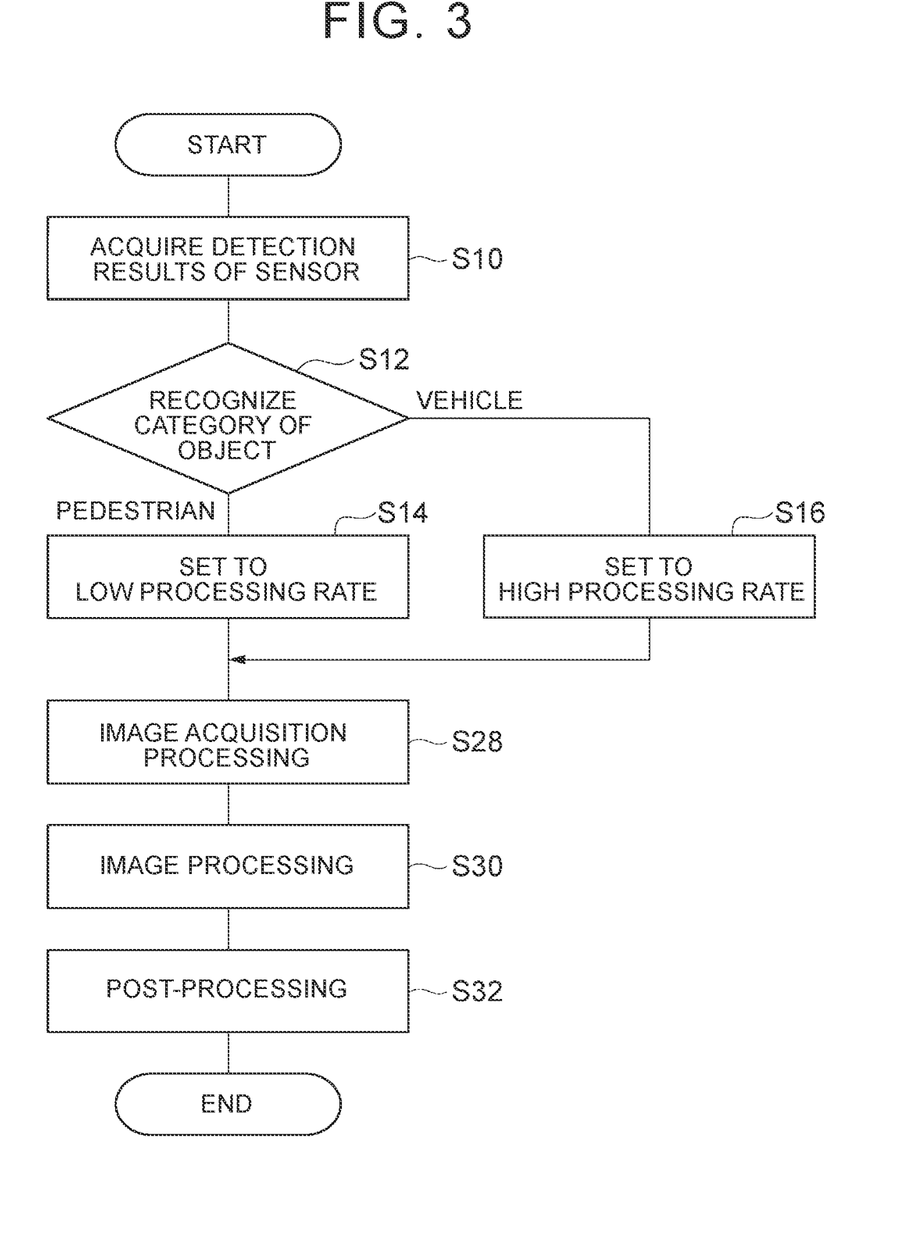
FIG. 3 is a flowchart showing an example of operations of the image processing device according to the embodiment.

FIG. 3 is a flowchart showing an example of operations of the image processing device according to the embodiment. The flowchart shown in FIG. 3 is executed by the image processing device 1 at a timing when a start button of the image processing function provided in the vehicle 2 is turned on, for example. Note that in the following, a recognized object will be described as being either a pedestrian or a vehicle.

As shown in FIG. 3, the recognition unit 10 of the image processing device 1 acquires the detection results of the sensor in step S10. The recognition unit 10 acquires the detection results of the external sensor 3.

Subsequently, in step S12, the recognition unit 10 recognizes the category of the object based on the detection results of the sensor acquired in step S10. When the category of the object recognized by the recognition unit 10 is a pedestrian, the decision unit 11 of the image processing device 1 sets the processing rate to the low processing rate in step S14 (FIG. 2C). When the category of the object recognized by the recognition unit 10 is a vehicle, the decision unit 11 sets the processing rate to the high processing rate in step S16 (FIG. 2D).

When step S14 or step S16 ends, the acquisition unit 12 of the image processing device 1 acquires the images obtained by continuously shooting the object as a subject from the image sensor in step S28.

Subsequently, the calculation unit 13 of the image processing device 1 executes image processing in step S30. The calculation unit 13 selects the target images from the images acquired in step S28 based on the processing rate decided in step S14. The calculation unit 13 calculates information regarding the object based on the target images selected by the calculation unit 13.

Subsequently, the ECU 5 executes post-processing in step S32. For example, the vehicle control unit 14 of the ECU 5 operates the vehicle 2 as post-processing. Note that the image processing device 1 may store information regarding the object in the storage unit of the ECU 5, or display the information regarding the object on the HMI 6, as post-processing. When step S32 ends, the flowchart shown in FIG. 3 ends. When the flowchart shown in FIG. 3 ends, the processing is executed again from step S10 until an end condition is satisfied. Examples of the end condition are when an end button of the image processing function is turned on, and so forth. By executing the flowchart shown in FIG. 3, the processing rate is changed according to the category of the subject.

Summarization of Embodiment

In the image processing device 1, the processing rate, which is the number of images subjected to image processing per second (an example of a unit time), is decided based on the category of the object. The target images are then selected from the images obtained by continuously shooting the object as the subject, based on the processing rate. Information regarding the object is then calculated based on the target images. Thus, the image processing device 1 can decide a processing rate suitable for each subject. Accordingly, the image processing device 1 can appropriately perform image processing in accordance with the subject.

The recognition unit 10 of the image processing device 1 recognizes the categories of objects in the surroundings of the vehicle, based on the detection results of the image sensor. Thus, a common sensor can be used between the recognition unit 10 and the acquisition unit 12.

Modifications

Although various types of exemplary embodiments have been described above, various types of omissions, substitutions, and changes may be made without being limited to the above-described exemplary embodiments.

For example, the recognition unit 10 of the image processing device 1 may further recognize states of objects. A state of an object is a state of change in appearance. Examples of the state of an object when the object is a pedestrian include a state of waving, a state of not waving, a state of wearing a hat, a state of not wearing a hat, and so on. Examples of the state of an object when the object is a vehicle include the lighting state of brake lamps (taillamps), the lighting state of direction indicators, and so on. In the following, a case in which the state of the object is the lighting state of the brake lamps of a vehicle will be described as an example.

The decision unit 11 of the image processing device 1 decides the processing rate based on the category and state of the object recognized by the recognition unit 10. The decision unit 11 adjusts the processing rate decided according to the category, in accordance with the state of the object. For example, when the category is "vehicle", the decision unit 11 does not set the processing rate to just the high processing rate, but sets the processing rate to the high processing rate or a medium processing rate. The medium processing rate is a processing rate that is higher than the low processing rate associated with the category "pedestrian", and is a processing rate that is lower than the high processing rate associated with the category "vehicle". As an example, the decision unit 11 sets the high processing rate when the recognition unit 10 recognizes that the brake lamps of the vehicle 8 are lit, and sets the medium processing rate when the recognition unit 10 recognizes that the brake lamps of the vehicle 8 are not lit. When the brake lamps of the vehicle 8 are lit is a driving scene in which the speed difference between the vehicle 8 and the vehicle 2 may be greater than when the brake lamps of the vehicle 8 are not lit. Accordingly, the decision unit 11 sets the high processing rate when the brake lamps of the vehicle 8 are lit, and the medium processing rate when the brake lamps of the vehicle 8 are not lit, whereby an appropriate processing rate can be decided in more detail. Note that the medium processing rate may be set in advance, or may be obtained by subtracting a predetermined processing rate from the high processing rate within a range that does not result in the low processing rate.

Figure 4:
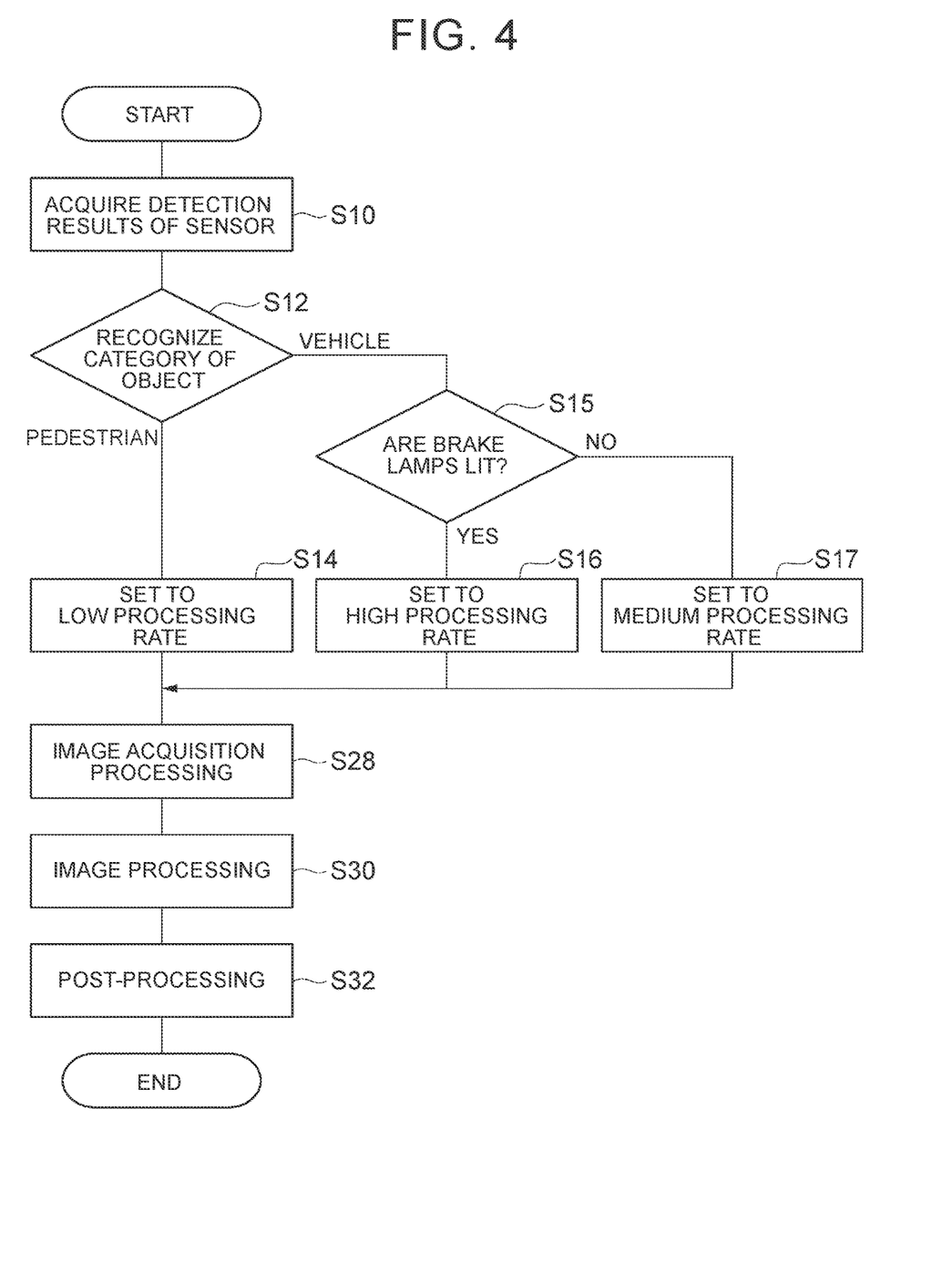
FIG. 4 is a flowchart showing an example of operations of an image processing device according to a modification.

FIG. 4 is a flowchart showing an example of operations of the image processing device according to a modification. The flowchart shown in FIG. 4 is the same as the flowchart shown in FIG. 3, except for the point that steps S15 and S17 are added.

When the category of the object is recognized as being a vehicle in step S12, the decision unit 11 determines in step S15 whether the brakes lamps are lit. The decision unit 11 recognizes whether the brake lamps are lit based on the detection results of the image sensor. When the decision unit 11 determines that the brake lamps are lit (step S15: YES), the decision unit 11 sets the processing rate to the high processing rate in step S16. When the decision unit 11 determines that the brake lamps are not lit (step S15: NO), the decision unit 11 sets the processing rate to the medium processing rate in step S17. All other processing is the same as in FIG. 3. By executing the flowchart shown in FIG. 4, the image processing device 1 can perform image processing according to not only the category of the object but also the state of the object.

As a further modification, the decision unit 11 can also increase the processing rate when the relative speed between the vehicle 2 and the object is equal to or higher than a threshold value. The decision unit 11 calculates the relative speed between the vehicle 2 and the object based on the detection results of the external sensor 3, and compares the relative speed calculated by the decision unit 11 with the threshold value. The threshold value is a value set in advance, for determining increase or decrease in the processing rate. When the relative speed calculated by the decision unit 11 is equal to or higher than the threshold value, the decision unit 11 determines that the positional change of the object between frames is great, and increases the processing rate. For example, when the relative speed between the vehicle 2 and the vehicle 8 is equal to or higher than the threshold value, the decision unit 11 adds a predetermined increase rate (e.g., 2 fps) to the processing rate RA of the category "vehicle". Note that the rate of increase may be increased in proportion to the relative speed.

The decision unit 11 can also reduce the processing rate when the relative speed between the vehicle 2 and the object is less than the threshold value. When the relative speed calculated by the decision unit 11 is less than the threshold value, the decision unit 11 determines that the positional change of the object between frames is not great, and reduces the processing rate. For example, when the relative speed between the vehicle 2 and the vehicle 8 is less than the threshold value, the decision unit 11 subtracts a predetermined rate of reduction (e.g., 2 fps) from the processing rate RA of the category "vehicle". Note that the absolute value of the rate of reduction may be increased in proportion to the relative speed. Thus, the decision unit 11 can decide an appropriate processing rate in more detail.

Figure 5:
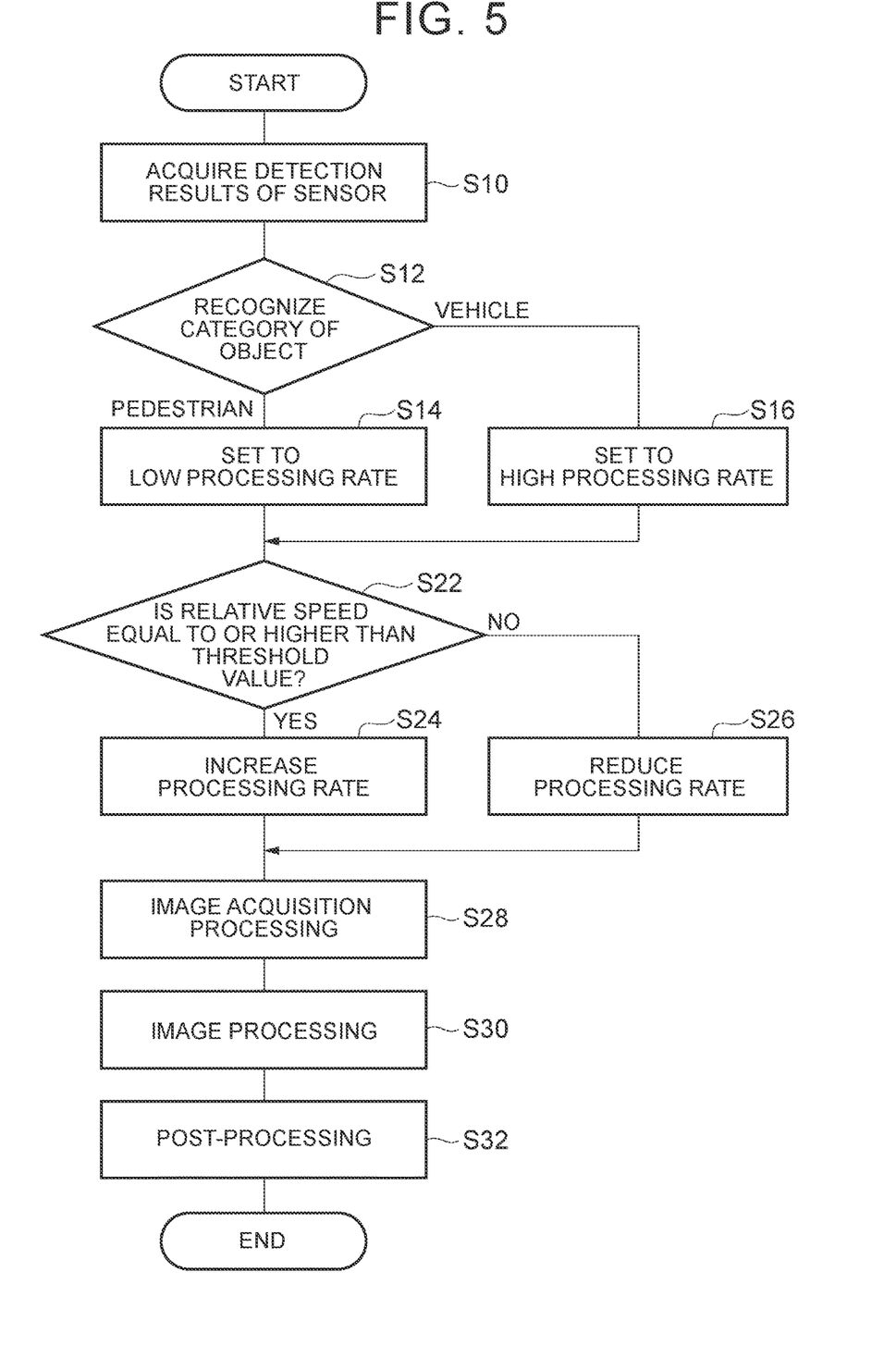
FIG. 5 is a flowchart showing an example of operations of the image processing device according to the modification.

FIG. 5 is a flowchart showing an example of operations of the image processing device according to the modification. The flowchart shown in FIG. 5 is the same as the flowchart shown in FIG. 3, except for the point that steps S22, S24, and S26 are added.

In step S22, the decision unit 11 determines whether the relative speed between the vehicle 2 and the object is equal to or higher than the threshold value. When the relative speed is equal to or higher than the threshold value (step S22: YES), the decision unit 11 increases the processing rate in step S24. When the relative speed is less than the threshold value (step S22: NO), the decision unit 11 reduces the processing rate in step S26. By executing the flowchart shown in FIG. 5, the image processing device 1 can adjust the processing rate in accordance with the relative speed.

Also, in FIG. 3, the decision unit 11 of the image processing device 1 executes the process of determining the category of the object in step S12, but the category of the object is not limited to vehicles and pedestrians. In FIG. 3, when the category of the object is neither a vehicle nor a pedestrian, the processing rate may be set to a standard processing rate set in advance. The standard processing rate may be set higher than the low processing rate, and lower than the high processing rate, for example.

An image processing device according to a first aspect of the present disclosure includes one or more processors configured to: recognize a category of an object within a range of a predetermined distance with respect to a vehicle based on a detection result of a sensor, the sensor including an image sensor; decide the number of images subjected to image processing per unit time based on the category of the object recognized by the one or more processors; acquire, from the image sensor, a plurality of images obtained by continuously shooting the object as a subject; select one or more target images from among the images acquired by the one or more processors based on the number of images subjected to the image processing per unit time decided by the one or more processors; and calculate information regarding the object based on the one or more target images.

In the above aspect, the number of images subjected to the image processing per unit time (hereinafter referred to as a processing rate) is decided based on the category of the object. The target images are then selected from the images acquired by the acquisition unit based on the processing rate. Information regarding the object is then calculated based on the target images. Thus, the image processing device can decide a processing rate that is suitable for each subject. Accordingly, the image processing device can appropriately perform image processing in accordance with the subject.

In the above aspect, the one or more processors may be configured to recognize the category of the object within the range of the predetermined distance with respect to the vehicle based on the detection result of the image sensor. In this case, recognition of the object and calculation of information regarding the object can be performed by using a single image sensor.

In the above aspect, the one or more processors may be configured to increase the number of images subjected to the image processing per unit time decided by the one or more processors when a relative speed between the vehicle and the object is equal to or higher than a threshold value. The greater the relative speed between the vehicle and the object is, the greater the change in the position of the object between the frames is. Accordingly, when the relative speed between the vehicle and the object is equal to or higher than the threshold value, the image processing device can suppress the positional change of the object between frames by increasing the processing rate, and thus perform appropriate image processing.

In the above aspect, the one or more processors may be configured to reduce the number of images subjected to the image processing per unit time decided by the one or more processors when a relative speed between the vehicle and the object is less than a threshold value. The smaller the relative speed between the vehicle and the object is, the smaller the change in the position of the object between the frames is. Accordingly, when the relative speed between the vehicle and the object is smaller than the threshold value, the image processing device can suppress the decrease in the image processing time allowed per frame by reducing the processing rate.

In the above aspect, the one or more processors may be configured to further recognize a state of the object; and the one or more processors may be configured to decide the number of images subjected to the image processing per unit time based on the category and the state of the object recognized by the one or more processors. In this case, the image processing device can perform image processing in more detail in accordance with not only the category of the object but also the state of the object.

In the above aspect, the one or more processors may be configured to calculate the relative speed between the vehicle and the object based on the detection result of the sensor, and compare the relative speed calculated by the one or more processors with the threshold value set in advance.

An image processing method according to a second aspect of the present disclosure is executed by one or more processors. The image processing method includes: recognizing a category of an object within a range of a predetermined distance with respect to a vehicle based on a detection result of a sensor, the sensor including an image sensor; deciding the number of images subjected to image processing per unit time based on the category of the object; acquiring, from the image sensor, a plurality of images obtained by continuously shooting the object as a subject; selecting one or more target images from among the images based on the number of images subjected to the image processing per unit time; and calculating information regarding the object based on the one or more target images.

A non-transitory storage medium according to a third aspect of the present disclosure stores instructions that are executable by one or more processors and that cause the one or more processors to perform functions including: recognizing a category of an object within a range of a predetermined distance with respect to a vehicle based on a detection result of a sensor, the sensor including an image sensor; deciding the number of images subjected to image processing per unit time based on the category of the object; acquiring, from the image sensor, a plurality of images obtained by continuously shooting the object as a subject; selecting one or more target images from among the images based on the number of images subjected to the image processing per unit time; and calculating information regarding the object based on the one or more target images.

What is claimed is:

1. An image processing device comprising one or more processors configured to:
    determine an object category of an object within a predetermined distance from a host vehicle based on a detection result of a sensor, the sensor including an image sensor;
    set the target number of images subjected to image processing per unit time such that a first number is set as the target number when the object category is a pedestrian, and a second number is set as the target number when the object category is a vehicle, the first number being smaller than the second number;
    acquire a plurality of images from the image sensor, the plurality of images being obtained by continuously shooting the object as a subject at a predetermined frame rate;
    select the set target number of target images from among the acquired plurality of images; and
    calculate information regarding the object based on the selected target images.

2. The image processing device according to claim 1, wherein the one or more processors are configured to determine the object category of the object within the predetermined distance from the host vehicle based on the detection result of the image sensor.

3. The image processing device according to claim 1, wherein the one or more processors are configured to set the target number such that the target number is increased according to a relative speed between the host vehicle and the object when the relative speed is equal to or higher than a threshold value.

4. The image processing device according to claim 3, wherein the one or more processors are configured to calculate the relative speed between the host vehicle and the object based on the detection result of the sensor, and compare the relative speed calculated by the one or more processors with the threshold value set in advance.

5. The image processing device according to claim 1, wherein:

the one or more processors are configured to further determine a state of the object; and the one or more processors are configured to set the target number based on the object category and the state of the object.

6. The image processing device according to claim 5, wherein:

the target number is set to the second number when the object category is the vehicle and the determined state is a state where brake lamps of the vehicle are not lit, and the target number is set to a third number when the object category is the vehicle and the determined state is a state where the brake lamps of the vehicle are lit, the third number being larger than the first number and smaller than the second number.

7. The image processing device according to claim 1, wherein the one or more processors are configured to set the target number such that the target number is reduced according to a relative speed between the host vehicle and the object when the relative speed is less than a threshold value.

8. The image processing device according to claim 1, wherein:

the one or more processors are configured to control the host vehicle by operating an actuator of the host vehicle based on the calculated information regarding the object.

9. An image processing method executed by one or more processors, the image processing method comprising:

determining an object category of an object within a predetermined distance from a host vehicle based on a detection result of a sensor, the sensor including an image sensor;

setting the target number of images subjected to image processing per unit time such that a first number is set as the target number when the object category is a pedestrian, and a second number is set as the target number when the object category is a vehicle, the first number being smaller than the second number;

acquiring a plurality of images from the image sensor, the plurality of images being obtained by continuously shooting the object as a subject at a predetermined frame rate;

selecting the set target number of target images from among the_acquired plurality of images; and calculating information regarding the object based on the selected target images.

10. A non-transitory storage medium storing instructions that are executable by one or more processors and that cause the one or more processors to perform functions comprising:

determining an object category of an object within a predetermined distance from a host vehicle based on a detection result of a sensor, the sensor including an image sensor;

setting the target number of images subjected to image processing per unit time such that a first number is set as the target number when the object category is a pedestrian, and a second number is set as the target number when the object category is a vehicle, the first number being smaller than the second number;

acquiring a plurality of images from the image sensor, the plurality of images being obtained by continuously shooting the object as a subject at a predetermined frame rate;

selecting the set target number of target images from among the acquired plurality of images; and calculating information regarding the object based on the selected target images.

* * * * *